June 30, 1959
R. A. EKSTROM, JR
2,892,348
FLOWMETER FOR FLUIDS
Filed Aug. 3, 1955
4 Sheets-Sheet 1
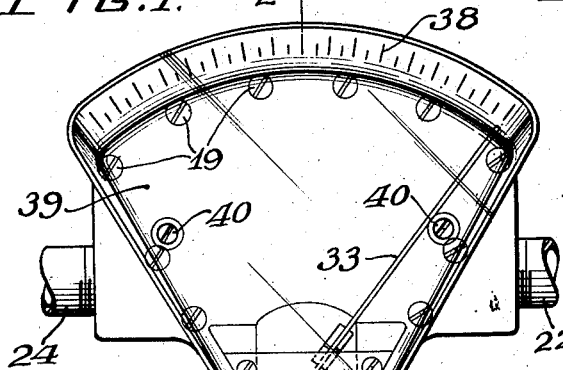
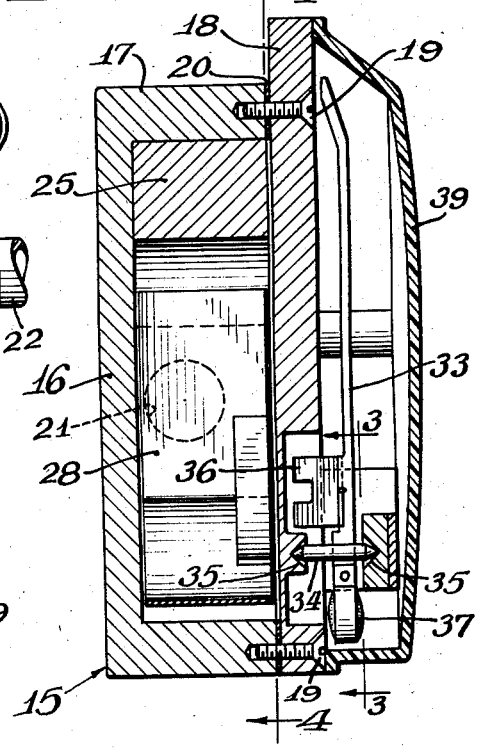
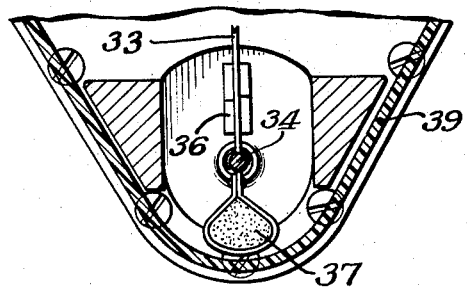
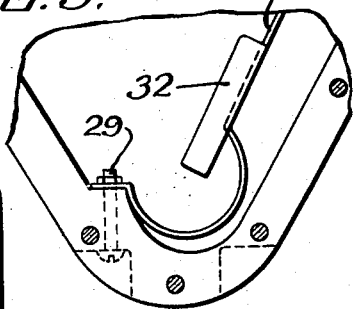
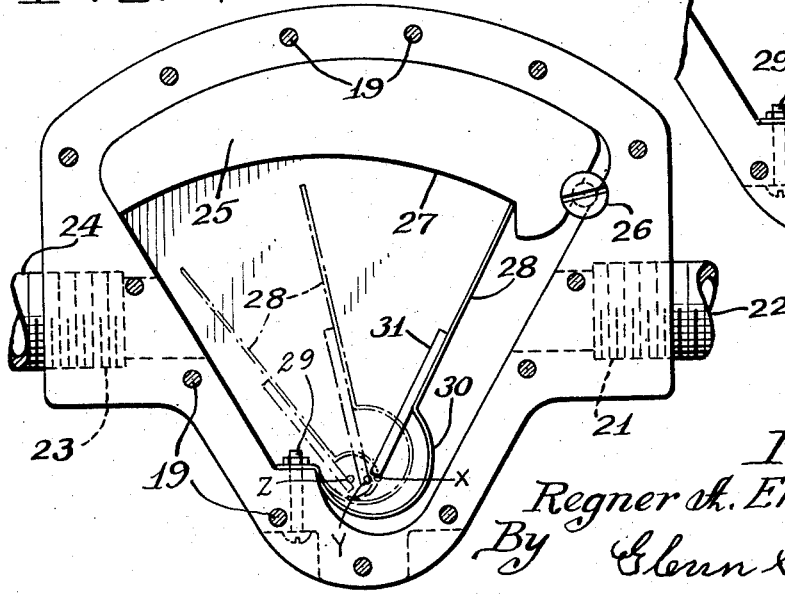
Inventor:
Regner A. Ekstrom Jr.
By Glenn S. Noble
Atty.

June 30, 1959 R. A. EKSTROM, JR 2,892,348
FLOWMETER FOR FLUIDS
Filed Aug. 3, 1955 4 Sheets-Sheet 2
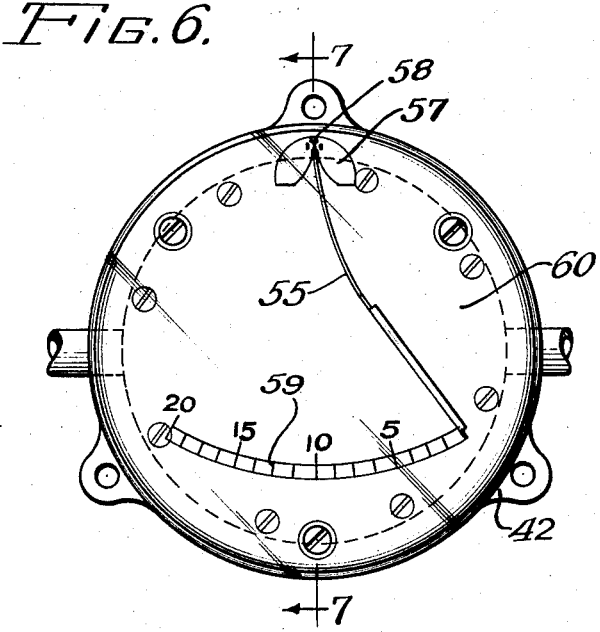
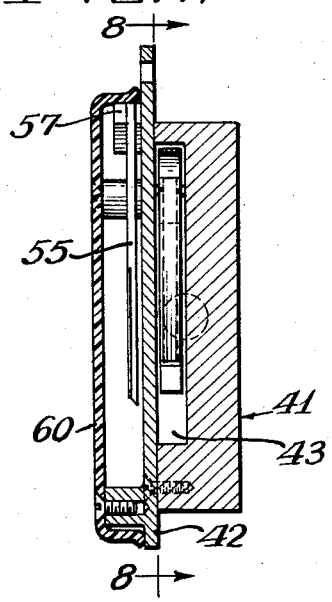
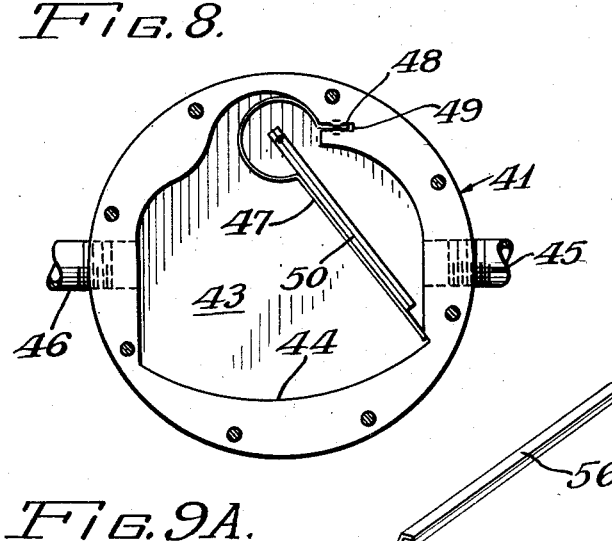
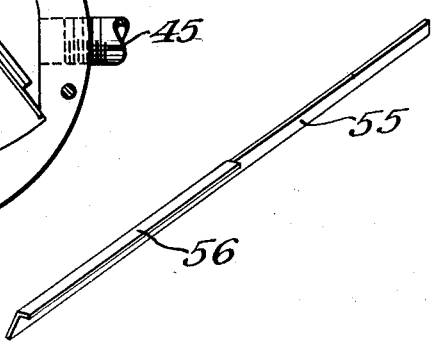
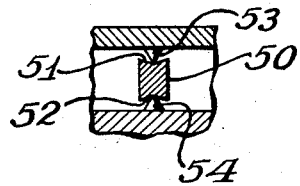
Inventor:
Regner A. Ekstrom Jr.
By Glenn S. Noble
Atty.

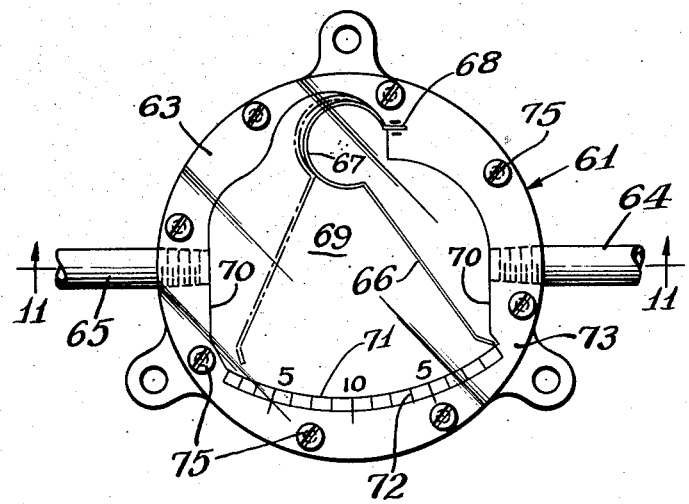
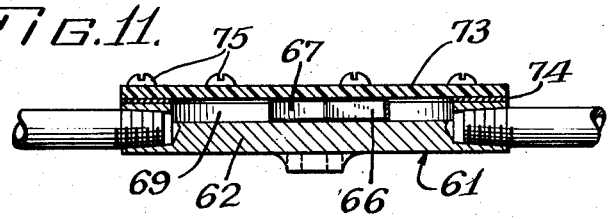
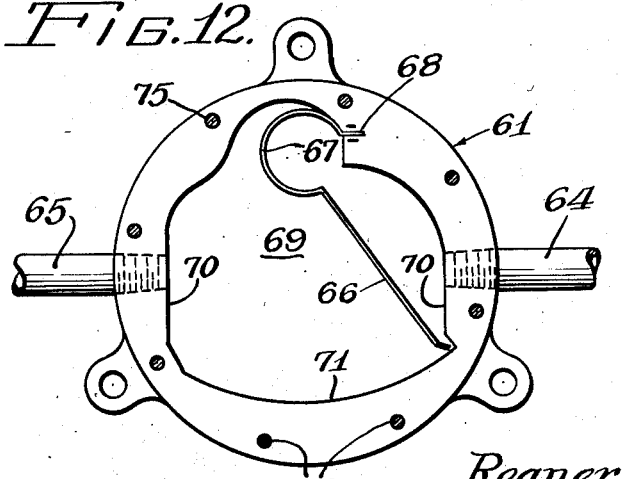
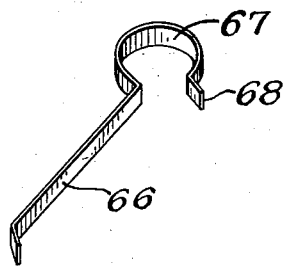

June 30, 1959 R. A. EKSTROM, JR 2,892,348
FLOWMETER FOR FLUIDS
Filed Aug. 3, 1955
4 Sheets-Sheet 4

Inventor:
Regner A. Ekstrom Jr.
By Glenn S. Noble
Atty.

United States Patent Office 2,892,348
Patented June 30, 1959

2,892,348

FLOWMETER FOR FLUIDS

Regner A. Ekstrom, Jr., Harvey, Ill.

Application August 3, 1955, Serial No. 526,185

9 Claims. (Cl. 73—228)

This invention relates to flowmeters which provide means for measuring and indicating the flow of liquids, slurries or gases in a conduit or pipe.

Among the objects of this invention are to avoid objectionable features of previous devices and to provide a simple and efficient mechanism for the purposes indicated.

Other objects and advantages will appear more fully from the following specification taken in connection with the accompanying drawings in which, Fig. 1 is a front or top view of an improved meter embodying the present invention.

Fig. 2 is a longitudinal sectional view taken substantially on the line 2—2 of Fig. 1 and shown on a larger scale.

Fig. 3 is a sectional detail taken on the line 3—3 of Fig. 2.

Fig. 4 is a sectional view taken on the line 4—4 of Fig. 2.

Fig. 5 is an enlarged detail showing the mounting of a combined vane and armature.

Fig. 6 is a front or plan view showing a modified form of construction.

Fig. 7 is a sectional view taken substantially on the line 7—7 of Fig. 6.

Fig. 8 is a top or front view with the cover removed.

Fig. 9 is a perspective view of the pointer or hand shown in Fig. 6; Fig. 9A is a detail.

Fig. 10 is a front or top view of a further modified form.

Fig. 11 is a sectional view taken on the line 11—11 of Fig. 10.

Fig. 12 is a front view with the cover removed, and

Fig. 13 is a perspective view of the combined vane and pointer shown in Figs. 10 and 11.

Figure 14:
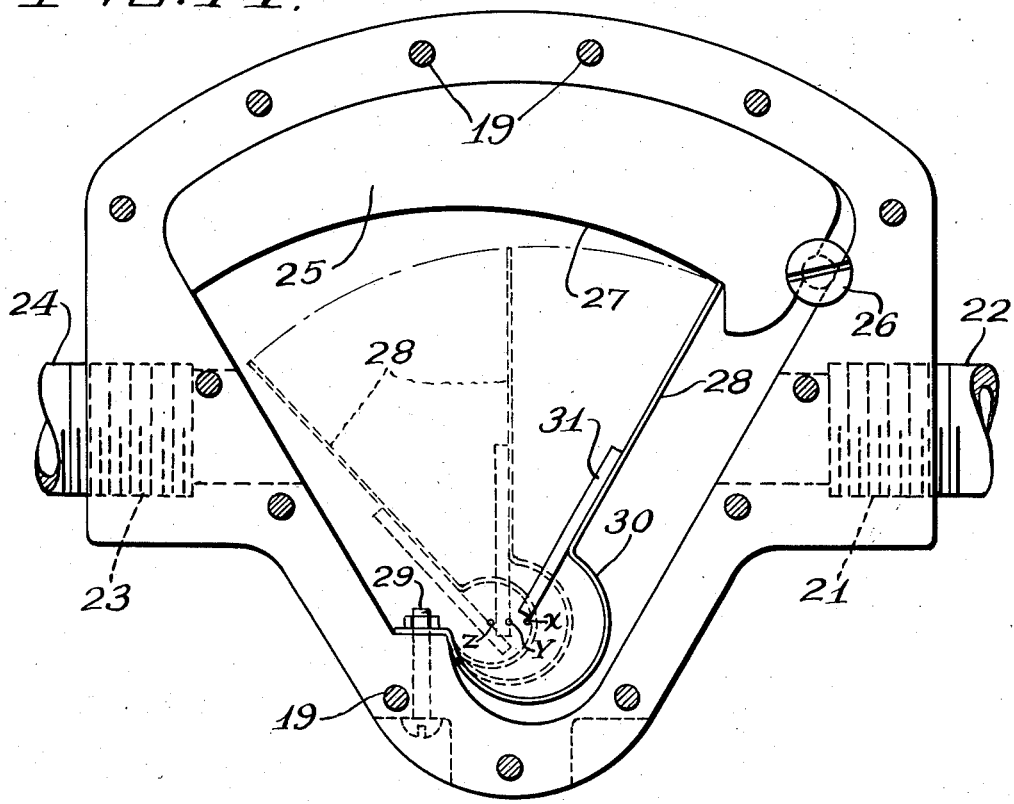
Figure 15:
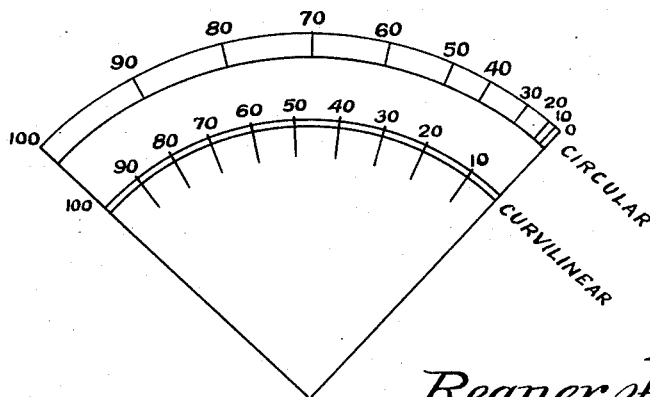

The meter has a body portion or case 15 which may be made of any suitable material and of any particular shape, but preferably triangular as shown. This case can be easily cast, molded or formed in a machine body if desired, and for most purposes may be made of aluminum. The case has a bottom 16 and a peripheral wall 17. It is closed by a cover 18 which is secured by means of screws 19 and provided with a gasket 20. The body has an intake opening 21 for the intake pipe 22 and an outlet opening 23 for the outlet pipe 24. These openings are on opposite sides of the case and preferably in alignment with each other.

A curved insert 25 fits closely in the enlarged portion of the body and is held in position by a screw 26. This insert is preferably made of the same material as the body. It fits the contour of the body on three sides and is curved on the fourth side as shown at 27 to provide a gradually increasing area as the measuring vane traverses the body. This vane or plate 28 is formed of flexible material depending upon the nature of the fluid to be measured. It is fastened at one end in any suitable manner as by means of rivets, spot welding, brazing, soldering, cementing or by means of bolts 29 which extend to the wall of the case as best shown in Fig. 4. The portion of the vane adjacent to the fastened end is of circular shape for approximately 240° as shown at 30, and then continues at a straight portion which extends approximately to the insert 25 when in normal position.

The operation and function of the vane particularly with reference to the substantially C-shaped circular curved portion 30 is best illustrated in Fig. 4. As shown in this figure, when the blade 28 is in normal position as shown at the right, the C-shaped curved portion which is substantially a curved spring will be fully extended. Then as the blade moves under the influence of the incoming fluid, the curved portion will be "wound up" or contracted so that the blade moves around travelling or movable centers as indicated at $x$, $y$ and $z$. The effect of this is to cause the outer end of the blade to travel on a curvilinear arc as shown by the dotted line. This drawing-in, as it were, of the blade provides for a gradually increasing space or passageway between the blade and the wall 27. This spring-like action of the said curved portion of the blade causing the movement on a varying or floating center, also tends to increase the life of the blade as it is not continuously bent at any one point while in operation. As shown in the drawings, this permits the calibration to be spaced almost evenly and permits relatively large spacing at the beginning of movement which is not possible with ordinary instruments of this kind which, on the contrary, are necessarily provided with circular calibrations extremely small at the beginning and gradually increased to substantially greater widths.

The vane is approximately the same width as the distance between the bottom 16 and the cover plate so that it practically closes the intake when in normal position. As the flow increases, the vane 28 moves toward the opposite wall of the body and the space between the end of the vane and the insert gradually increases as indicated by the dotted lines of Fig. 4. This vane or movable element may be made of any suitable material as from a strip of flexible Phosphor bronze, beryllium copper, or spring steel. It may be made of suitable thickness depending upon the size of the meter for instance, .010 to .040 will have sufficient rigidity for its weight and thickness to return to its position in the meter regardless of how the meter is positioned. This feature of lack of sensitivity to position of the meter is of very great advantage in that they do not have to be levelled when installed.

Movement of the vane or blade 28 is by virtue of the pressure of flow of the fluid through the meter. The resistance to flow or pressure drop across the meter is dependent on the thickness or stiffness of the vane material and the area of the space between the vane and the insert. Theoretically, the area between the vane and the insert should increase as to the square of the distance the vane travels. However, in practice due to flow eddys in gas and liquid, and the influence of the body and impact deflections in the case, the flow characteristics vary. To give an indicating scale of the desired characteristics, which can be approximately uniform, the shape of the insert is experimentally determined.

At approximately the point where the vane becomes straight after the 240° curvature, an armature 31 is provided. This armature may be of soft iron or magnetic metal attached to the vane or if the vane is made of steel, a portion 32 may be formed integrally with the vane and turned over as shown in Fig. 5.

A pointer or hand 33 is mounted on a pivot 34 in bearings 35 on the cover at approximately the center of the circular portion of the vane. A magnet 36 is attached to the pointer at a short distance from the pivot and the pointer is provided with a counter-balance 37 so that it will rotate freely.

The face of the cover is provided with a scale 38 for indicating the position of the pointer 33 when the flowmeter is in operation. This may be a predetermined scale or the calibration may be done to indicate actual flow as shown by measure instruments used for such purposes.

The meter is calibrated at the temperature at which it is to see service and it can be corrected for any variations therefrom.

In operation, the fluid entering the inlet pipe 22 will impinge or press against the vane 28 and cause it to move toward the opposite wall. During this movement, the space between the vane and the insert 25 is gradually increased as above described. After passing the vane, the fluid is discharged through the discharge pipe 24 in a continuous operation. As the vane moves, the magnet 36 which is magnetically coupled to the vane through the armature 31 overcomes any friction in the bearings of the suspended pointer.

On account of this magnetic drag on the pointer, it indicates the flow and is responsive to small variations in flow and change as there are no gears, links or lost motion in transmitting the movement of the vane to the pointer.

The meter is provided with a protecting cover 39 formed of transparent material such as plastic, glass, or the like, through which the dial may be readily seen. In view of the fact that my improved flowmeter has no mechanical communication between the movable element or vane and the external pointer, no fluid can leak from the case and as a consequence, the flowmeter will be particularly accurate as well as durable in operation.

The cover is secured by means of screws 40.

In the form of the invention shown in Figs. 6–9A, the case or body 41 is similar to the one just described and is provided with a cover 42 defining a somewhat triangular space 43 having a curved lower wall 44 and provided with an inlet pipe 45 and outlet pipe 46 as shown. In this instance, the blade 47 has a curved end portion with a short straight terminal 48 which is fastened to the body by being pinched in a slot 49 as shown in Fig. 8. A somewhat elongated magnet 50 is secured to the blade or vane and extends upwardly to approximately the pivotal point for the vane. The magnet 50 has longitudinal slots 51 and 52 as shown in Fig. 9A which are engaged by pivot points 53 and 54 on the cover and body portion respectively. The arrangement is such that as the blade swings, the pivots will cause the magnet and blade to swing around the pivotal points without undue deflection.

In this form of the invention, a pointer 55 consists of a steel strip having a portion bent at right angles as shown at 56 to provide an armature to coact with the magnet on the vane. At one end of the vane is held in a lug 57 which extends upwardly from a cover and has a slot 58 in which the end of the vane is secured by pinching the adjacent portions of the metal against the vane. The vane will normally be flexed so that the free end will register with the beginning or zero point of the scale or calibration 59 on the cover 42. The pointer is protected by a transparent cover 60 as shown.

With this form of the device, as the vane 55 is moved by virtue of the flow of a fluid passing through the case, the magnet which is magnetically coupled through the pointer will cause the pointer to move along the scale 59 and indicate the flow through the meter.

Figs. 10–13 show a particularly simple form of the invention which may be made in relatively small sizes for use in measuring the flow of gasoline or oil used by aircraft, diesel, or other engines. The case or body 61 is of substantially circular shape with a bottom 62 and irregular shaped side wall 63 as shown particularly in Fig. 10.

The meter is provided with an intake pipe 64 and an outlet pipe 65. The vane or blade 66 is formed of flexible material such as above described and has a substantially circular curved portion 67 with a projection 68 which is secured in the wall 63 by being inserted in a slot and the sides pinched in as indicated. The curved portion of the vane acts in the nature of a substitute for a pivot, when the vane is moved during its operation. The space or chamber 69 through which the fluid passes has substantially parallel side walls 70 which are joined at the top by an irregular contour as shown and are joined at the bottom by a circular curved portion 71 which is traversed by the free end of the blade. The curvature is such that as the blade moves under the influence of the fluid, the space between the end of the blade and the curved wall will increase in such proportion as may be desired for proper measurement.

The measuring scale 72 in this instance is marked or calibrated directly on the upper face of the case. The case is closed by a transparent cover 73 and gasket 74 which may be held by screws 75. While the blade or vane and the chamber in which it operates are shown as being comparatively narrow, it will, of course, be obvious that the meter may be made in any size desired.

This form of the device is particularly intended for liquids which are clear and are not apt to contaminate the meter. When the blade is moved under the influence of the fluid passing through the meter, its position may be readily seen through the cover and the rate of flow as indicated by the scale may be noted.

From this description, it will be seen that as my improved instrument contains no mechanical parts which are apt to cause friction or misalignment with wear, the meter will be particularly accurate and long lasting.

While I have referred particularly to the measurement of liquids and gases, it will be noted that my meter can also be used for measuring particulate matter which will flow through the measuring chamber, such as grain or seeds.

Having thus described my invention, what I claim is:

1. A flow meter comprising a substantially circular body having a measuring chamber therein with an inlet and an outlet, a portion of the inner wall of the chamber being curved, a vane formed of flexible metal of substantially the same width as the height of the chamber and having a curved portion of substantially 240° adjacent to one end with an outwardly extending flange, said flange being secured in a slot in the case opposite the curved end, a magnet having grooves in the edges thereof secured to the vane and extending to and approximately the center of the curved portion of the vane, pivot points from the case engaging with said slots and adapted to guide the vane in its rotating movement, a pointer having one end secured to the cover of the case adjacent with the pivot point of the vane and having one edge turned over to form an armature, a scale on the cover for indicating the movement of the pointer and vane, and a transparent cover enclosing the pointer.

2. In a flowmeter, the combination of a case defining a measuring chamber with a curved wall, a vane formed of flexible metal substantially the same width as the chamber, a C-shaped spring, one end of which is connected to the vane and the other end of said spring being connected to the case opposite the curved wall so that the free end of the vane is adjacent the curved wall, an inlet in the case on one side of the vane, an outlet in the case on the other side of the vane, the vane being normally positioned adjacent to the inlet and adapted to move across the curved wall with increasing space between the end of the vane and the curved wall as flow through the casing increases, a pointer pivotally mounted on the outside of the case, and means for coupling the vane and the pointer whereby the pointer will follow the movement of the vane.

3. A flowmeter in accordance with claim 2, in which the curved wall comprises a detachable element insertable in the case, the curved wall portions of the elements opposite the end of the vane being varied by inserting elements of different curvatures.

4. A flowmeter comprising a case having a generally triangular measuring chamber therein with a curved wall opposite the apex, a vane substantially the same width as the chamber including a C-shaped spring of resilient material, one end of which is connected to the wall adjacent the apex and the other end of the vane extending to the curved portion of the wall, the free end of the vane traversing the curved portion of the wall with a gradually increasing space therebetween due to the contraction of the C-shaped portion of the spring, and means on the outside of the case coacting with the vane for indicating the rate of flow through the chamber.

5. In a flowmeter, the combination of the case and a cover therefor which define a measuring chamber of uniform width having a curved wall in one side of the chamber, a vane comprising a flat metal strip having a curved portion of more than 180° adjacent one end, means for fastening the said adjacent end to the case in the chamber opposite the curved wall, the other end of the vane extending to a point adjacent to the curved wall, an inlet and an outlet for the chamber on opposite sides of the vane, the free end of the vane traversing the curved portion of the wall with increasing space therebetween due to the said curved portion in the vane, a pointer pivotally mounted on the cover adjacent the fixed end of the vane, and means coupling the pointer with the vane to follow the movement thereof.

6. In a flowmeter, the combination with a case and a cover therefor which defines a measuring chamber of circular segmental form having a curved wall on one side thereof, an oscillating vane of substantially the same width as the chamber to respond to dynamic action of fluid flowing through the chamber and comprising a flat strip of resilient material having a portion in a partially curved loop of more than 180°, one end of the spring near the loop being fastened in the case opposite the curved wall and the other end of the spring forming the vane being free to oscillate and to extend with a varying distance of approach to the curved wall as it is moved in the chamber, and an inlet and an outlet for the chamber on opposite sides of the vane.

7. A flowmeter in accordance with claim 6 in which the curved portion of the vane has its convex side facing the inlet of the measuring chamber and is free to oscillate about different centers located within the curved portion causing the free end of the vane to describe a curved path of varying radii of curvatures.

8. A flowmeter in accordance with claim 6, in which the curved portion of the vane is contracted or expanded, depending upon its direction of movement to provide virtual centers of oscillation moving progressively and causing the free end of the vane to describe a curvilinear path of diminishing radii of curvatures as the velocity of flow increases.

9. In a flowmeter, the combination with a case and its cover which define a measuring chamber of circular segmental form having a curved wall on one side thereof, an oscillating vane of substantially the same width as the chamber to respond to dynamic action of fluid flowing through the chamber and comprising a flat spring of resilient material having a circular partially looped curve between the ends, means for fastening one end of the vane to the case opposite the curved wall and leaving the other end of the vane free to oscillate and to extend with varying distances of approach to the curved wall, an inlet and an outlet for the chamber on opposite sides of the vane, and said curved wall comprising a detachable element so that the curvature of the wall opposite the free end of the vane can be varied, said element being insertable in the case for the curved portion of the wall to vary the spacing between it and the free end of the vane as the latter is moved.

References Cited in the file of this patent

UNITED STATES PATENTS

| 1,111,684 | Vaughan | Sept. 22, 1914 |
| 2,060,848 | Boyle | Nov. 19, 1936 |
| 2,168,353 | Linebarger | Aug. 8, 1939 |
| 2,296,169 | Linebarger | Sept. 19, 1942 |
| 2,315,182 | Boyle | Mar. 30, 1943 |

FOREIGN PATENTS

| 140,964 | Great Britain | Apr. 8, 1920 |
| 277,914 | Great Britain | Sept. 29, 1927 |
| 143,648 | Sweden | Jan. 12, 1954 |